United States Patent [19]

Yoshinaka

[11] 4,438,456
[45] Mar. 20, 1984

[54] TIME BASE CORRECTOR

[75] Inventor: Tadaaki Yoshinaka, Hadano, Japan

[73] Assignee: Sony Corporation, Tokyo, Japan

[21] Appl. No.: 360,904

[22] Filed: Mar. 23, 1982

[30] Foreign Application Priority Data

Mar. 28, 1981 [JP] Japan .................................. 56-45754

[51] Int. Cl.³ ............................................. H04N 5/06
[52] U.S. Cl. .................... 358/148; 358/150; 358/320
[58] Field of Search .................... 358/148, 150, 17, 19, 358/320, 337; 360/36.1

[56] References Cited

U.S. PATENT DOCUMENTS

| | | | |
|---|---|---|---|
| 4,110,785 | 8/1978 | Dischert | 358/320 |
| 4,123,774 | 10/1978 | Hjortzberg | 358/320 |
| 4,231,063 | 10/1980 | Ito | 358/148 |

Primary Examiner—Michael A. Masinick
Attorney, Agent, or Firm—Lewis H. Eslinger; Alvin Sinderbrand

[57] ABSTRACT

A time base corrector for removing time base errors from composite color video signals has a write clock and write start pulse generating circuit for providing write clock and write start pulses in synchronism with horizontal sync signals separated from the incoming composite color video signal, a read clock and read start pulse generating circuit receiving reference video signals and being operative to generate read clock and read start pulses on the basis of such reference video signals, a memory into which the incoming color video signals are written for temporary storage in response to the write clock and write start pulses and from which the temporarily stored color video signals are read in response to the read clock and read start pulses, a circuit connected with the read clock and read start pulse generating circuit for provided added sync and sub-carrier signals which are inserted in the color video signals from the memory, and a phase control circuit for varying a phase of the separated horizontal sync signals with which the write clock and write start pulses are synchronized in accordance with changes in the relative phase of the read start pulses and the added sync signals.

13 Claims, 3 Drawing Figures

TIME BASE CORRECTOR

BACKGROUND OF THE INVENTION

1. Field of the Invention

This invention relates generally to a time base corrector or TBC for correcting jitter or time base fluctuation in color video signals reproduced by a recording and/or reproducing apparatus, such as, a video tape recorder or VTR.

2. Description of the Prior Art

A time base corrector or TBC is known in which incoming composite color video signals are supplied to an analog-to-digital or A/D converter to be converted to a digital color signal which is to be temporarily stored in a memory. Write clock and write start pulses are generated in synchronism with horizontal sync signals separated from the incoming composite color video signals and are employed to control the sampling of the latter by the A/D converter and the writing of the resulting digital color signal in the memory. Read clock and read start pulses are generated on the basis of reference burst signals and reference sync signals separated from reference video signals applied to the TBC, and such read clock and read start pulses control the reading out of the temporarily stored color video signals from the memory to a digital-to-analog or D/A converter, whereupon added sync and sub-carrier or burst signals are inserted in the resulting analog color video signal. In the known TBC, a synchronous circuit is provided by which the read start pulses produced from the added sync signals will occur in a predetermined synchronized relationship with the added sub-carrier or color burst signals. Moreover, the known TBC has phase shifters which are controllable to shift the phase of the burst signal of the output of the TBC, and further to shift the phases of the sub-carrier and sync signals of the output of the TBC relative to the sub-carrier and sync signals of the reference video signals. However, when these phase shifts are effected, the timing of the read start pulses relative to the added sync signals is changed with the result that the image provided on the screen of a CRT or monitor by the output of the TBC is shifted transversely.

OBJECTS AND SUMMARY OF THE INVENTION

Accordingly, it is an object of the present invention to provide a time base corrector which avoids the foregoing disadvantages of the prior art.

More specifically, it is an object of the present invention to provide a time base corrector for removing time base errors from composite color video signals, and in which an out-of-phase condition of the color video signals delivered by the time base corrector as a result of phase control of reference horizontal sync and sub-carrier signals separated from a reference video signal is avoided.

In accordance with an aspect of this invention, a time base corrector for removing time base errors from composite color video signals comprises horizontal sync separating means for separating horizontal sync signals from the incoming composite color video signals, write clock and write start pulse generating means for generating write clock and write start pulses in synchronism with the horizontal sync signals separated from the incoming composite color video signals, read clock and read start pulse generating means having an input for receiving reference video signals and being operative to generate read clock and read start pulses on the basis of such reference video signals, memory means into which the incoming color video signals are written, preferably after conversion from analog-to-digital form, for temporary storage in response to the write clock and write start pulses and from which the temporarily stored color video signals are read in response to the read clock and read start pulses, whereupon the read out color video signals are reconverted from digital-to-analog form, means connected with the read clock and read start pulse generating means for providing added sync and sub-carrier or burst signals and inserting such added sync and sub-carrier signals in the color video signals read from the memory means, and phase control means for varying a phase of the separated horizontal sync signals with which the write clock and write start pulses are synchronized in accordance with a change in the relative phase of the read start pulses and the added sync signals.

Preferably, in a time base corrector according to the invention, the read clock and read start pulse generating means includes a synchronous circuit receiving the added sync signals and generating the read start pulses therefrom in synchronism with the read clock pulses.

In one particular embodiment of this invention, the phase control means includes phase shifting means interposed between the horizontal sync separating means and the write clock and write start pulse generating means for determining the phase with which the separated horizontal sync signals are applied to the write clock and write start pulse generating means, means for separating horizontal sync signals from the color video signals which are read from the memory means and which are indicative of the phase of the read start pulses, and phase comparing means comparing the phases of the horizontal sync signals separated from the color video signals read from the memory means and of the added sync signals and providing a comparison output for actuating or controlling the phase shifting means acting on the horizontal sync signals separated from the incoming color video signals.

In another particular embodiment of the invention, the synchronous circuit includes phase shifting means receiving the added sync signals and controllably phase shifting the latter to provide a signal from which the read start pulses are formed, and phase comparing means for comparing a phase of the output of the phase shifting means with a phase of the read clock pulses and providing a corresponding comparison output applied to the phase shifting means for determining the amount of phase shift imparted thereby to the signal forming read start pulses relative to the added sync signals, and the phase control means for the horizontal sync signals separated from the incoming color video signals includes another phase shifting means interposed between the horizontal sync separating means and the write clock and write start pulse generating means and being controlled by said comparison output of the phase shifting means in the synchronous circuit.

The above, and other objects, features and advantages of the invention, will be apparent in the following detailed description of illustrative embodiments thereof which is to be read in connection with the accompanying drawings in which the same reference numerals are employed to identify corresponding parts in the several views of the drawings.

DETAILED DESCRIPTION OF THE PREFERRED EMBODIMENTS

Figure 1:
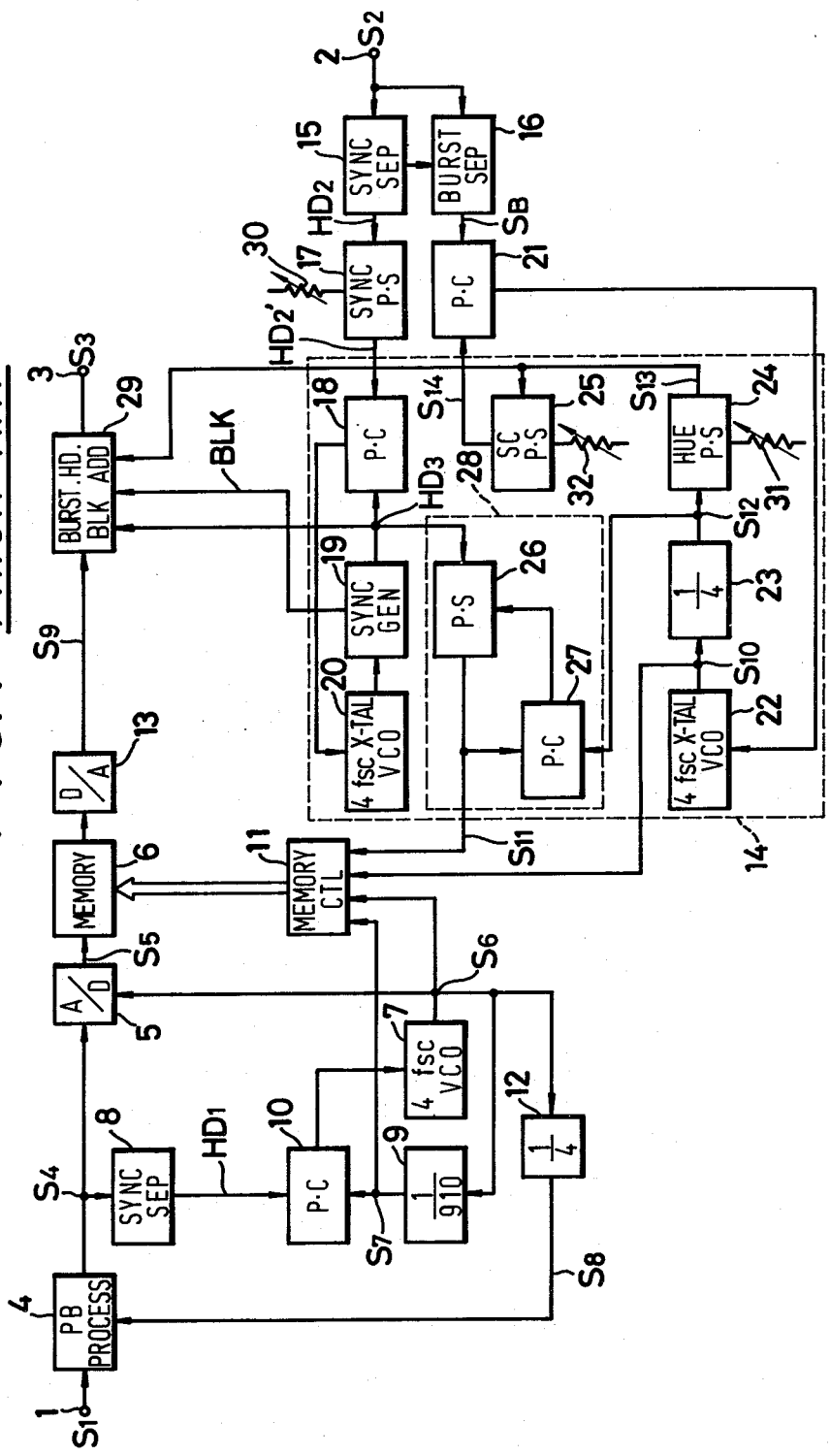
FIG. 1 is a block diagram of a time base corrector according to the prior art.

In order that the problem to be overcome by this invention may be fully understood, reference will first be made to a digital time base corrector or TBC according to the prior art which, as shown on FIG. 1, has an input terminal 1 receiving a reproduced color video signal $S_1$, for example, from the rotary head of a video tape recorder or VTR. The known TBC further has an input terminal 2 for receiving a reference video signal $S_2$, and an output terminal 3 for delivering a corrected color video signal $S_3$ which is synchronized with the period of horizontal sync signal and the phase of color burst signals included in reference video signal $S_2$.

Conventional ¾ inch cassette-type helical scan video tape recorders usually employ the so-called under-chroma recording system in which the luminance component of the color video signal to be recorded is frequency-modulated while the chrominance component is converted to a low frequency from its standard sub-carrier frequency of 3.58 MHz. Thus, assuming that the reproduced color video signal $S_1$ applied to terminal 1 of the TBC in FIG. 1 is of the under-chroma type, such incoming color video signal is supplied to a playback process circuit 4 in which the luminance component is frequency-demodulated while the chrominance component is reconverted from the low frequency used for recording back to the standard sub-carrier frequency. As shown particularly on FIG. 2, playback process circuit 4 may include a high-pass filter 41 and a low-pass filter 42 for separating the frequency modulated luminance component and the frequency converted chrominance component, respectively, from the incoming under-chroma type color video signal. The separated frequency-modulated luminance component is supplied from filter 41 to a frequency demodulator 43, and the resulting demodulated luminance component is supplied to one input of a mixer or adder 50. The frequency converted chrominance component separated by filter 42 is supplied to a frequency converter 44 for reconversion back to the original or standard sub-carrier frequency, and the resulting reconverted chrominance component is fed from converter 44 to another input of mixer 50 which combines the frequency-modulated luminance component and frequency reconverted chrominance component to form a video signal $S_4$ of standard format. A color burst signal is extracted or derived from the output of frequency converter 44 by means of a burst gate 45 and is phase compared, in a comparator 47, with a sub-carrier from a reference oscillator 48 or with a return sub-carrier $S_8$ which, as hereinafter described in detail, is derived from the TBC when the latter is of the direct process type. The sub-carrier output from reference oscillator 48 and the return sub-carrier $S_8$ from the TBC are selectively applied to comparator 47 by way of a selector switch 49. In either case, the phase comparison of the separated color burst signal with the reference or return sub-carrier results in a comparison output from comparator 47 employed as a control voltage for a voltage controlled oscillator 46 which generates a frequency converting signal supplied to frequency converter 44. The loop comprised of frequency converter 44, burst gate 45, comparator 47 and voltage controlled oscillator 46 is a so-called automatic phase control or APC loop for removing jitter from the reproduced chrominance signal.

Returning to FIG. 1, it will be seen that, in the TBC according to the prior art there illustrated, the color video signal $S_4$ from playback process circuit 4 is supplied to an analog-to-digital or A/D converter 5 to be converted to a digital color video signal $S_5$ which is to be temporarily stored or written in a memory 6. A voltage controlled oscillator or VCO 7 provides an oscillation output or signal $S_6$, for example, having a central frequency of $4 \times f_{sc}$, that is, four times the standard sub-carrier frequency, so as to be suitable for use as the sampling pulse supplied to A/D converter 5 and also as the write clock pulse to be supplied to memory 6. The oscillation output of VCO 7 is phase-synchronized with the horizontal period of color video signal $S_4$. For this purpose, a horizontal sync signal $HD_1$ is separated by a sync separator 8 from color video signal $S_4$ and is applied to one input of a phase comparator 10 which, at its other input, receives a signal $S_7$ obtained from a frequency divider 9 in which the output signal $S_6$ from VCO 7 is divided by 910. Thus, in the case where $f_{sc}$ is 3.58 MHz, the signal $S_7$ is provided with a frequency of 15.75 KHz which corresponds to the frequency of the separated horizontal sync signal $HD_1$. In response to the phase comparison of signals $HD_1$ and $S_7$, the phase comparator 10 provides a comparison output which acts as a control voltage for VCO 7, whereby the output signal $S_6$ is phase-synchronized with horizontal sync signal $HD_1$ so as to be suitable as a sampling pulse for A/D converter 5 and also as a driving pulse for a memory control circuit 11. Memory control circuit 11 also receives signal $S_7$ from frequency divider 9 and is operative, in response to signals $S_6$ and $S_7$, to provide a write clock synchronous with signal $S_6$ and a write start pulse or signal in a predetermined relationship to signal $S_7$ so as to start each writing in memory 6 at a predetermined point, for example, at a position between the color burst signal and the video information portion, in video signal $S_5$.

The output signal $S_6$ of VCO 7 is further shown to be supplied to a frequency divider 12 to be therein frequency-divided by 4 and thereby provide the signal $S_8$ of the standard sub-carrier frequency $f_{sc}$ which is returned to playback process circuit 4. In response to the application of such returned sub-carrier signal $S_8$ to the APC loop in playback process circuit 4, interleaving of the luminance and chrominance components in color video signal $S_4$ is accomplished, that is, any jitter in the chrominance component is made to be substantially identical to jitter in the luminance component.

The signals temporarily stored in memory 6 are read out from the latter at a rate determined by a read clock which, as hereinafter described, is synchronous with a color burst signal of reference video signal $S_2$. The signal read out from memory 6 is supplied to a digital-to-analog or D/A converter 13 to be converted by the latter into an analog video signal $S_9$. Such signal $S_9$ is made to be synchronous with the horizontal scanning period and the color burst signal of the reference video signal $S_2$ so as to be free of jitter.

Figure 2:
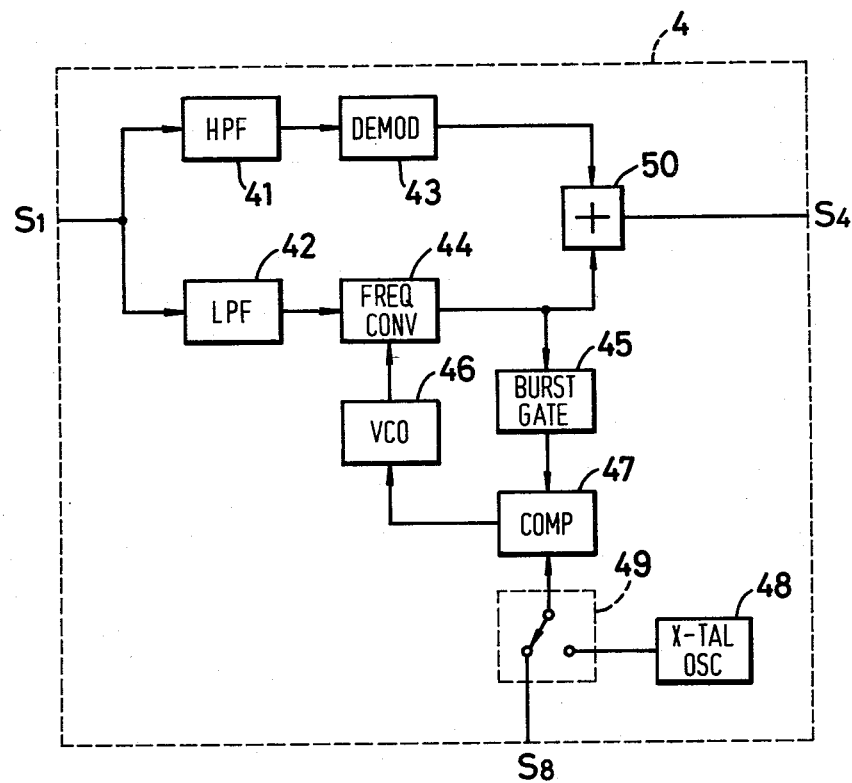
FIG. 2 is a block diagram of a playback process circuit included in the time base corrector of FIG. 1.

More particularly, the TBC of FIG. 1 is shown to further include a signal generator 14 forming signals $S_{10}$ and $S_{11}$ which are applied to memory control circuit 11, and from which the latter provides the necessary read clock and read start pulses for memory 6. The reference video signal $S_2$ is supplied from input terminal 2 to a sync separator 15 and a burst separator 16 by which a reference horizontal sync signal $HD_2$ and a reference burst signal $S_B$ are extracted from the reference video signal $S_2$. The extracted reference sync signal $HD_2$ is passed through a phase shifter 17 to one input of a phase comparator 18 which, at its other input, receives from a sync signal generator 19 a horizontal sync signal $HD_3$ to be added to video signal $S_9$. As a result of its phase comparison of the added horizontal sync signal $HD_3$ and the phase shifted reference sync signal $HD'_2$, comparator 18 provides a corresponding comparison output which is applied, as a control voltage, to a voltage controlled oscillator or VCO 20. The VCO 20 has a central frequency of $4 \times f_{sc}$ and its oscillation output drive sync signal generator 19 so that the added horizontal sync signal $HD_3$ and an added blanking signal BLK also produced by sync signal generator 19 are synchronized with the phase-shifted sync signal $HD'_2$.

The separated reference burst signal $S_B$ is applied from separator 16 to one input of a phase comparator 21 which has its comparison output applied, as a control voltage, to a voltage controlled oscillator or VCO 22 having a central frequency of $4 \times f_{sc}$ so as to provide the earlier mentioned signal $S_{10}$ from generator circuit 14 to memory control 11 and with which the read clock pulse is synchronized. The signal $S_{10}$ from VCO 22 is also supplied to a frequency divider 23 where it is divided by 4 to provide a signal $S_{12}$ of the sub-carrier frequency $f_{sc}$ which is supplied through a phase shifter 24 to provide a signal $S_{13}$. The phase-shifted signal $S_{13}$ is further passed through a phase shifter 25 to provide a signal $S_{14}$ which is applied to the other input of phase comparator 21. Thus, the signal $S_{14}$ is phase compared with the reference burst signal $S_B$ in phase comparator 21 and the resulting comparison output of comparator 21 acts as a control voltage for VCO 22 so that the signal $S_{10}$ from which the read clock is formed is synchronized with the reference burst signal $S_B$ in a predetermined relation dependent on phase shifters 24 and 25.

The added horizontal sync signal $HD_3$ from sync signal generator 19 is further shown to be supplied through a phase shifter 26 to provide the signal $S_{11}$ from circuit 14 to memory control 11 and from which the read start pulse is formed. Such signal $S_{11}$ from phase shifter 26 is also applied to one input of a phase comparator 27 which, at its other input, receives the signal $S_{12}$ from frequency divider 23 to effect phase comparison of signals $S_{11}$ and $S_{12}$. The resulting comparison output of phase comparator 27 is applied to phase shifter 26 for adjusting or controlling the amount of phase shift provided by the latter. Phase shifter 26 and phase comparator 27 constitute a synchronous circuit 28 by which signal $S_{11}$ for forming the read start pulse is synchronized with signal $S_{12}$ even if added horizontal sync signal $HD_3$ has its phase shifted, for example, by adjustment of phase shifter 17. Although the frequency of signal $S_{11}$ is the horizontal or line frequency, for example, 15.75 KHz, and the frequency of the signal $S_{12}$ is the sub-carrier frequency, for example, 3.58 MHz, synchronous circuit 28 functions to synchronize the successive pulses of signal $S_{11}$ with respective pulses occurring at intervals in the pulse train constituting signal $S_{12}$. For example, the pulses making up signal $S_{11}$ may be pulses sampled from the pulse train of signal 22 at suitable intervals.

The signal $S_{13}$ obtained through phase shifter 24 from the signal $S_{12}$ is supplied to a sync signal adder 29 receiving the color video signal $S_9$ from D/A converter 23, and sync signal adder 29 is operative to insert signal $S_{13}$, as a color burst signal, in a predetermined interval of signal $S_9$. Horizontal sync signal $HD_3$ and blanking signal BLK from sync generator 19 are also supplied to sync signal adder 29 to be inserted by the latter in respective predetermined intervals of signal $S_9$. Thus, the signal $S_3$ at the output terminal 3 of the known TBC is obtained from the output of adder 29 and is the result of the addition to the color video signal $S_9$ of the signals $S_{13}$, $HD_3$ and BLK.

The phase shifters 17, 24 and 25 which vary the phases of the signals $HD'_2$, $S_{13}$ and $S_{14}$, respectively, are shown to be controllable by variable resistor 30, 31 and 32, respectively. Manipulation of variable resistor 31 for varying the phase shift imparted by phase shifter 24 is effective to control or vary the phase of signal 13 and hence of the burst signal of the video signal $S_3$ obtained at output terminal 3 of the TBC. Manipulation of variable resistor 32 for varying the phase shift effected by phase shifter 25 is effective to shift the phase of signal $S_{14}$ relative to the phase of reference burst signal $S_B$ so that the output of phase comparator 21 suitably controls VCO 22 to change the phase of the sub-carrier of the output video signal $S_3$ relative to the phase of separated burst signal $S_B$ of the referenc video signal $S_2$.

It will be appreciated that, when the amount of phase shift imparted by phase shifter 25 is varied by manipulation of resistor 32, the resulting phase change of signal $S_{14}$ relative to the reference burst signal $S_B$ causes the comparison output of phase comparator 21 to vary the phase of the output $S_{10}$ of VCO 22 and hence of signal $S_{12}$. Since synchronous circuit 28 operates to maintain a synchronous or predetermined phase relation of signal $S_{11}$ to signal $S_{12}$ the phase of signal $S_{11}$ is changed in response to the change in the phase of signal $S_{12}$, and thereby causes the read start point established by memory control 11 to be shifted, for example, by as much as 280 nsec. Such shifting of the read start point causes a corresponding phase shift of the output video signal $S_3$ so that, when the latter is displayed on the screen of a monitor or CRT, the resulting image is shifted transversely. Similarly, when the phase shifter 17 is adjusted by manipulation of variable resistor 30 for varying the phase of horizontal sync signal $HD_3$ of output video signal $S_3$ relative to horizontal sync signal $HD_2$ of reference video signal $S_2$, the phase of signal $S_{11}$ for determining the read start point continues in its fixed or predetermined relation to the phase of signal $S_{12}$ due to synchronous circuit 28 so that, once again, the displayed image shifts laterally or transversely on the screen of the monitor or CRT.

Generally, in accordance with this invention, the above described problems in the known TBC of FIG. 1 are avoided by varying the phase of the separated horizontal sync signals $HD_1$ with which the write clock and write start pulses are synchronized in accordance with changes in the relative phase of the read start pulses and the added sync signals $HD_3$.

Figure 3:
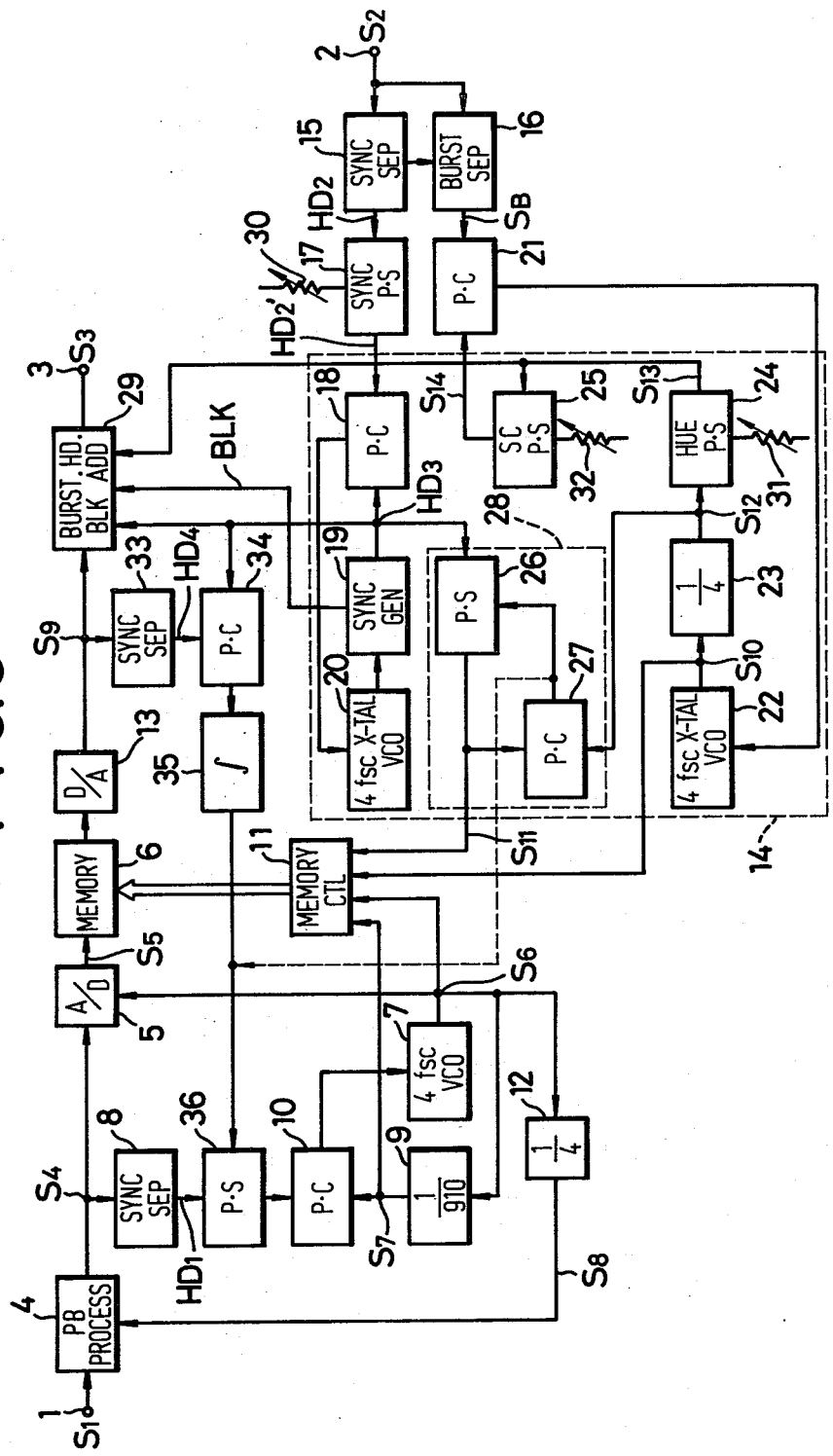
FIG. 3 is a block diagram of a time base corrector according to one embodiment of this invention, and showing in broken lines a connection that is provided in accordance with another or alternative embodiment of the invention.

More particularly, and as shown on FIG. 3 in which the various parts corresponding to those described above with reference to FIG. 1 are identified by the same reference numerals, in accordance with the embodiment of the invention there illustrated, a sync separator 33 is connected to the output of D/A converter 13 for separating a horizontal sync signal $HD_4$ from the corrected color video signal $S_9$. It will be apparent that the signal $HD_4$, in being separated from the video signal read out of memory 6, has a predetermined or fixed phase relation to the read start pulses with which memory control 11 effects the read out. The separated horizontal sync signal $HD_4$ is applied to one input of a phase comparator 34 having the added horizontal sync signal $HD_3$ applied to its other input. Thus, comparator 34 compares the phase of horizontal sync signal $HD_4$ separated from the corrected color video signal $S_9$, and hence having a predetermined phase relation to the read start pulses provided by memory control 11 from signal $S_{11}$, with the phase of added sync signal $HD_3$, and the resulting comparison output of phase comparator 34 is supplied through an integrator 35 to a control input of a phase shifter 36 interposed between sync separator 8 and phase comparator 10. Thus, the integrated comparison output of phase comparator 34 controls the phase of the horizontal sync signal $HD_1$ as applied to phase comparator 10. Thereafter, phase comparator 10 compares the phase of the phase shifted sync signal $HD_1$, as determined by the phase comparison between sync signals $HD_3$ and $HD_4$, with the phase of the frequency divided signal $S_7$, and the resulting comparison output controls VCO 7 for shifting the phases of signals $S_6$ and $S_7$ and thereby similarly shifting the phase of the write clock and write start pulses produced by memory control 11.

Therefore, when the amount of phase shift imparted by phase shifter 17 is changed by adjustment of variable resistor 30, the corresponding change in the phase of the added horizontal sync signal $HD_3$ from sync signal generator 19 relative to the phase of horizontal sync signal $HD_4$ is sensed at phase comparator 34 and the corresponding change in the comparison output from comparator 34 suitably varies the amount of phase shift imparted to horizontal sync signal $HD_1$ by phase shifter 36. Phase comparator 10 responds to the foregoing change in phase shift by phase shifter 36 and suitably controls VCO 7 so that signals $S_6$ and $S_7$, as applied to memory control 11, will change the write start point in the sense to restore the predetermined relationship between the phase of horizontal sync signal $HD_4$ separated from corrected color video signal $S_9$ and the phase of added horizontal sync signal $HD_3$, and thereby avoid the transverse shifting of the displayed image that would otherwise result. It will be noted that the predetermined phase relation is maintained between horizontal sync signals $HD_3$ and $HD_4$ even though there has been a shift in the phase relation of the added horizontal sync signal $HD_3$ relative to the reference sync signal $HD_2$ separated from reference video signal $S_2$, and hence relative to the read start point determined by signal $S_{11}$ which is maintained in a predetermined phase relation to signal $S_{12}$, and hence to reference burst signal $S_B$ separated from reference video signal $S_2$, by means of synchronous circuit 28.

Similarly, if the amount of phase shift imparted to signal $S_{14}$ by phase shifter 25 is varied by adjustment of resistor 32, phase comparator 21 causes VCO 22 to suitably vary the phase of signal $S_{13}$, and hence of the added color burst signal, relative to the phase of reference color burst signal $S_B$ separated from reference video signal $S_2$. In that case, the phase of signal $S_{12}$ is similarly varied in respect to the phase of reference burst signal $S_B$ and synchronous circuit 28 responds thereto by varying the phase of signal $S_{11}$ relative to the added horizontal sync signal $HD_3$ so as to change the read start point. Such change in the read start point alters the phase of signal $HD_4$ separated from corrected signal $S_9$ relative to the phase of signal $HD_3$ and phase comparator 34 responds thereto to control phase shifter 36 in the sense that will cause signals $S_6$ and $S_7$ to effect a change in the write start point by which the predetermined relation between the phases of signal $HD_3$ and $HD_4$ will be restored.

In the above described embodiment of the invention, a closed loop is employed from controlling phase shifter 36 on the basis of a comparison, in comparator 34, of the phases of signals $HD_3$ and $HD_4$. However, the sync separator 33, phase comparator 34 and integrator 35 shown on FIG. 3 can be omitted and phase shifter 36 can then be simply controlled on the basis of the phase of the read start pulses, for example, as represented by the signal $S_{11}$ from which the read start pulses are formed, relative to the phase of the added sync signals $HD_3$. More specifically, as indicated by the broken line 37 on FIG. 3, the foregoing control of phase shifter 36 may be effected by the comparison output of phase comparator 27. Such comparison output of phase comparator 27 determines the phase shift imparted by phase shifter 26 to signal $HD_3$ for providing the signal $S_{11}$ from which the read start pulses are formed, and hence inherently corresponds to the relation between the phase of the read start pulses and the phase of added sync signals $HD_3$.

It will be appreciated from the above described embodiments of the invention that, in each case, there is provided a time base corrector in which an incoming video signal $S_4$ is written in the memory 6 in response to a write clock which is synchronous with the horizontal sync signal $HD_1$ separated from the incoming video signal, and the video signal temporarily stored in the memory is read out therefrom in response to a read clock synchronous with a horizontal sync signal $HD_3$ and a sub-carrier signal $S_{13}$ derived from a reference horizontal sync signal $HD_2$ and a reference sub-carrier or burst signal $S_B$ respectively. Further, the write start point is shifted in accordance with any change in the phase of the reference sub-carrier $S_{13}$ or in the phase of the signal $S_{11}$ which determines the read start point. Thus, an out-of-phase condition of the output video signal $S_3$ is avoided when either of phase shifters 17 and 25 is adjusted for varying the phase of the added horizontal sync signal $HD_3$ or of the added burst signal $S_{13}$ relative to the reference horizontal sync signal $HD_2$ and the reference burst signal $S_B$, respectively.

Although particular embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A time base corrector for removing time base errors from composite color video signals comprising:

input circuit means for receiving incoming composite color video signals which include horizontal sync signals;

horizontal sync separating means connected with said input circuit means for separating said horizontal sync signals from said incoming composite color video signals;

write clock and write start pulse generating means for generating write clock and write start pulses in synchronism with said horizontal sync signals separated from the incoming composite color video signals;

read clock and read start pulse generating means having an input for receiving reference video signals and being operative to generate read clock and read start pulses on the basis of said reference video signals;

memory means into which said incoming color video signals are written for temporary storage in response to said write clock and write start pulses and from which the temporarily stored color video signals are read in response to said read clock and read start pulses;

means connected with said read clock and read start pulse generating means for providing added sync and sub-carrier signals and inserting said added sync and sub-carrier signals in said color video signals read from the memory means; and phase control means for varying a phase of said separated horizontal sync signals with which said write clock and write start pulses are synchronized in accordance with a change in the relative phase of said read start pulses and said added sync signals.

2. A time base corrector according to claim 1; in which said read clock and read start pulse generating means includes synchronous circuit means receiving said added sync signals and generating said read start pulses therefrom in synchronism with said read clock pulses.

3. A time base corrector according to claim 2; in which said phase control means includes phase shifting means interposed between said horizontal sync separating means and said write clock and write start pulse generating means for determining said phase of the separated horizontal sync signals, means for separating horizontal sync signals from said color video signals read from said memory means and which are indicative of the phase of said read start pulses, and phase comparing means comparing the phases of said horizontal sync signals separated from the color video signals read from the memory means and of said added sync signals and providing a comparison output for actuating said phase shifting means.

4. A time base corrector according to claim 3; in which said synchronous circuit means includes second phase shifting means receiving said added sync signals and controllably phase shifting the latter to provide said read start pulses therefrom, and second phase comparing means for comparing a phase of the output of said second phase shifting means with a phase of said read clock pulses and providing a corresponding second comparison output applied to said second phase shifting means for determining the amount of phase shift imparted thereby to said read start pulses relative to said added sync signals.

5. A time base corrector according to claim 2; in which said synchronous circuit means includes phase shifting means receiving said added sync signals and controllably phase shifting the latter to provide said read start pulses therefrom, and phase comparing means for comparing a phase of the output of said phase shifting means with a phase of said read clock pulses and providing a corresponding comparison output applied to said phase shifting means for determining the amount of phase shift imparted thereby to said read start pulses relative to said added sync signals.

6. A time base corrector according to claim 5; in which said phase control means includes another phase shifting means interposed between said horizontal sync separating means and said write clock and write start pulse generating means for determining said phase of the separated horizontal sync signals, and said comparison output of the phase comparing means is also applied to said other phase shifting means for controlling the amount of phase shift imparted by the latter to said separated horizontal sync signals.

7. A time base corrector according to claim 1; in which said reference video signals include reference sync signals and reference burst signals; and in which said means for providing added sync and sub-carrier signals includes means for separating said reference sync signals from said reference video signals, first phase shifting means adjustably shifting the phase of said separated reference sync signals, first voltage-controlled oscillator means for providing a first oscillation output, sync generating means for generating said added sync signals from said oscillation output, first phase comparing means comparing the output of said first phase shifting means with said added sync signals and providing a corresponding comparison output controlling said first voltage-controlled oscillator, means for separating said reference burst signals, second voltage-controlled oscillator means for providing a second oscillation output, means receiving said second oscillation output for providing said added sub-carrier signals therefrom and having second phase shifting means for adjustably varying the phase of said added sub-carrier signals, second phase comparing means, and means for applying said added sub-carrier signals and said separated reference burst signals to said second phase comparing means so that the latter provides a corresponding comparison output controlling said second voltage-controlled oscillator means.

8. A time base corrector according to claim 7; further comprising third phase shifting means for changing the phase of said added sub-carrier signals as applied to said second phase comparing means for comparison with said separated reference burst signals.

9. A time base corrector according to claim 7; in which said read clock and read start pulse generating means further includes means for deriving said read clock pulses from said second voltage controlled oscillator means, automatically controlled phase shifting means receiving said added sync signals and controllably phase shifting the latter to provide said read start pulses therefrom, and third phase comparing means for comparing a phase of the output of said automatically controlled phase shifting means with a phase of said read clock pulses and providing a corresponding comparison output applied to said automatically controlled phase shifting means for determining the amount of phase shift imparted thereby to said read start pulses relative to said added sync signals.

10. A time base corrector according to claim 9; in which said phase control means includes another automatically controlled phase shifting means interposed between said horizontal sync separating means and said write clock and write start pulse generating means for determining said phase of the separated horizontal sync signals, means for separating horizontal sync signals from said color video signals read from said memory means and which are indicative of the phase of said read start pulses, and fourth phase comparing means comparing the phases of said horizontal sync signals separated from the color video signals read from the memory means and of said added sync signals and providing a comparison output for controlling said other automatically controlled phase shifting means.

11. A time base corrector according to claim 9; in which said phase control means includes another automatically controlled phase shifting means interposed between said horizontal sync separating means and said write clock and write start pulse generating means for determining said phase of the separated horizontal sync signals, and said comparison output of said third phase comparing means is also applied to said other automatically controlled phase shifting means for controlling the amount of phase shift imparted by the latter to said separated horizontal sync signals.

12. A time base corrector according to claim 1; further comprising analog-to-digital converting means timed by said write clock pulses for converting said incoming composite color video signals to digital form prior to the temporary storage thereof in said memory means, and digital-to-analog converting means receiving the color video signals read from said memory means and restoring the same to analog form.

13. A time base corrector according to claim 1; in which said incoming composite color video signals are reproduced signals of the under-chroma type including a frequency-modulated luminance component and a frequency-converted chrominance component; and in which said input circuit means includes high-pass filter means and low-pass filter means for respectively separating said frequency-modulated luminance component and said frequency-converted chrominance component from said incoming composite color video signals, frequency-demodulating means for demodulating the separated frequency-modulated luminance component, frequency-converting means receiving the separated frequency-converted chrominance component and a converting signal for restoring the chrominance component to a standard sub-carrier frequency, burst gate means for extracting burst signals from the output of said frequency converting means, voltage-controlled oscillating means for providing said converting signal, and phase comparing means comparing the extracted burst signals with said write clock pulses and providing a corresponding comparison output as a control voltage for said voltage-controlled oscillating means.

* * * * *